United States Patent [19]

Crozzoli

[11] 4,290,443
[45] Sep. 22, 1981

[54] FLEXIBLE TUBE LIQUID TRANSFER DEVICE

[76] Inventor: Gualtiero Crozzoli, Via di Vermicino, 184, Rome, Italy

[21] Appl. No.: 6,514

[22] Filed: Jan. 25, 1979

[30] Foreign Application Priority Data

Jan. 25, 1978 [IT] Italy ................................ 47773 A/78

[51] Int. Cl.³ ............................................. F04F 10/00
[52] U.S. Cl. ..................................... 137/147; 137/149
[58] Field of Search ......................... 137/147, 148, 149

[56] References Cited

FOREIGN PATENT DOCUMENTS 193466 12/1907 Fed. Rep. of Germany ...... 137/149

*Primary Examiner*—Gerald A. Michalsky
*Attorney, Agent, or Firm*—McAulay, Fields, Fisher, Goldstein & Nissen

[57] ABSTRACT

A flexible tube liquid transfer device is provided, formed of three concentric flexible tubes to be used as a siphon. A coupling bush connects the inlet ends of the innermost and outermost tubes, sealing the outermost tube to permit liquid to flow into the innermost tube only, through the inlet. An elastic sealing member slidingly seals the middle tube to the outermost tube so that the middle tube can slide relative to the structure comprising the coupled together outermost and innermost tubes. A removable closure seals the outlet end of the middle tube.

To start the flow of liquid through the device, one need only slide the middle tube out of the assembly, wait until liquid is drawn up into the assembly by the partial vacuum thereby created, and open the closure at the end of the middle tube while holding the end of the middle tube below the liquid level in the liquid container. In this way, liquid will siphon out of the container without the need of pumps or other devices to start the liquid flowing.

5 Claims, 9 Drawing Figures

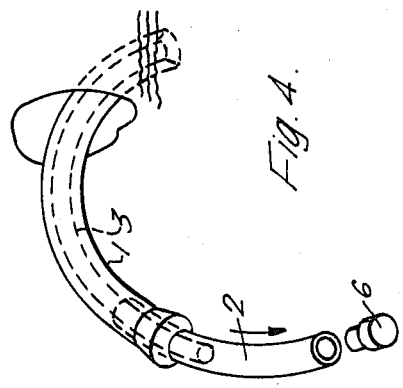
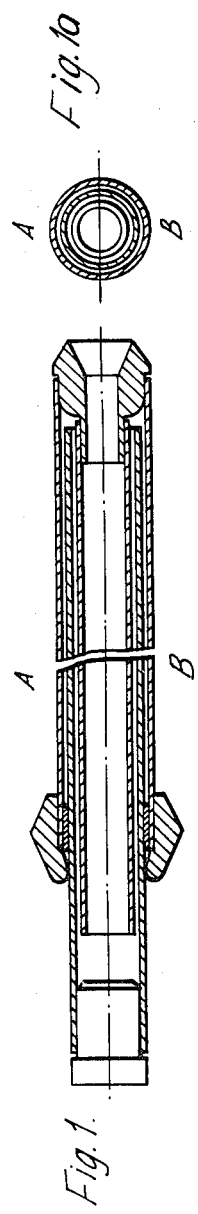
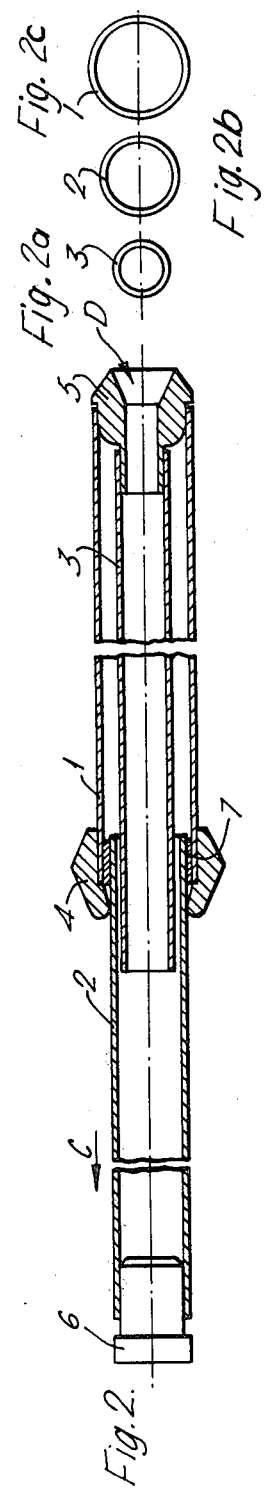
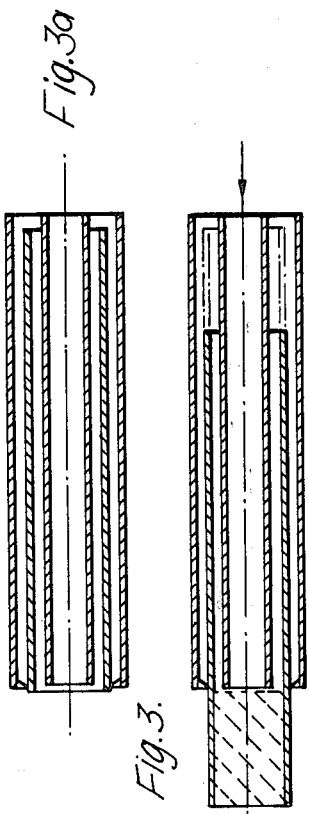

FLEXIBLE TUBE LIQUID TRANSFER DEVICE

The present invention concerns a flexible tube device for the transfer of liquids without a pump, and with a simple move on said device performed by the user. Such device may be used for any transfer of any liquid from one container to another.

It is well known that the transfer of the liquids represents a fundamental problem in the industry, for merchants, dealers and single persons, for those necessities which may be at an industry- or merchant level, or which may be given just by the moment, caused by situations which request an immediate practicity, rapidity, easiness and cheapness, respecting the hygiene rules.

Devices for transferring liquids are already well known, and they comprise flexible tubes. These devices indicate that it is inconvenient to remove the residuums which may have fouled the containers, and most of all they are inconvenient because they do not operate well in cold climates, i.e. at very low temperatures, and the functioning of the pump is blocked.

Other kinds of devices for transferring liquids have the disadvantage that they take away much space; in this case these devices, which are "emergency transferring devices", mainly for drivers, have the disadvantage that they can not be shortened nor extended. Finally, also in these cases a pump is necessary: otherwise it is necessary that the user performs a depression with his mouth, which results to be neither hygienic nor pleasant for the user himself.

It is therefore aim of the present invention to realize a device of the transfer of any liquid, which can be of any shape and cheap, and which functions at any temperature, without the need of a pump and with a very simple move of the user onto the device as to create the depression necessary for the operation.

The present invention reaches above aim realizing an assembly of three tubes, perferably out of polyethylene, at a low density, with evident flexibility features, of an increasing diameter one in respect of the other, i.e. one tube can be inserted in the other like a telescope, and the third tube, i.e. the innermost, being of the smallest diameter, being provided at one end thereof with a bush out of plastic material, out of one piece with said bush being internally empty, provided with two coupling in the same direction, so that they can be inserted, under pression, one in one end of the third tube, i.e. of the tube with the smallest diameter, and the other in one of the ends of the first tube, the tubes having no communication between each other, while the third tube projects with a small part thereof out of the other end of said first tube, and a second tube, of a medium diameter and dimension between said third tube and said first tube, will be keyed with the first part thereof onto said projecting part of said third tube, of lower diameter and inwardly pushed between said third and first tube until the lower end thereof will get into contact with said bush, and the other end thereof projects of a certain part beyond said first tube and beyond said third tube, and shows at the projecting end thereof a slide bibcock, which has been described in Italian patent application No. 51 739 A/78 of Nov. 2, 1978, of the same applicant and inventor, and said bibcock will be always closed, except in the real transfer operation, and the three tubes being keyed one onto the other in such a way as to leave between the circumferential surfaces thereof always an air stratus, the second and the first tube being sealed against the air.

The main principle of the present invention is not based on the suction of the kind that takes place with a syringe. Infact, if this was the case, and as the second tube—which will act as the sucking part of the syringe—is about as long as the third tube—which will act as the cylinder, once the inner end of the second tube has reached, as for the extraction of the second tube from the third tube, to the level (stop) of the outer end of the third tube, the liquid which has been sucked up to that stop level of the third tube, could not go on in the run thereof, and therefore there could not be any possibility of performing a transfer. It would not even be useful to extend the third and/or the second tube, as the syringe effect would in any case not change and the liquid could never pass the outer end of the third (inner) tube, and therefore the transfer could in any case not take place.

As above said method would not serve to anything for the outlet of the liquid which is to be transferred, it is therefore necessary to find a system which allows, in the case of a determined linear movement of the second tube in extraction in respect of the third tube, a flowing of the liquid at the inside of the third tube, which is as much as possible higher than the linear movement of the second tube in the suction stage thereof.

As a first consideration, to solve above said problem, it would be enough to realize the third tube in such a way as to be inserted under pression into the second tube, i.e. as to form together with the same, a perfect sealing. In this case, the second and the third tube should work in a way, opposite to the way a cynder and a piston of a syringe, i.e. that the cylinder (second tube) should have the sucking function (piston), while the piston (third tube) should have the function of the cylinder (second tube). In fact, in this case, the flowing of the liquid inside the third tube would be in any case major than the linear movement of the second tube with respect to the third. This would happen as the section of the first tube (in which the liquid flows) is smaller than the one of the second tube, which has the sucking function, and therefore the liquid would flow in a major proportion to the linear movement of the second tube.

This is explained by the fact that the depression volume which is created by the suction in the displacing section of the second is equal to the volume of the liquid sucked in the third tube.

Be it:

$V_2$ the depression volume sucked by the second tube, operating in the third tube;

$V_3$ the volume of the liquid sucked by the third tube;

$H_2$ the section of linear displacement along which the second tube, operating in the third tube, has moved;

$H_3$ the section along which the liquid has moved in the third tube;

$Si_2$ the inner section of the second tube;

$Si_3$ the inner section of the third tube, in which the liquid flows.

The following relations are obtained:

$$V_2 = V_3; \quad V_2 = H_2 \cdot Si_2; \quad V_3 = H_3 \cdot Si_3;$$

$$H_2 = \frac{V_2}{Si_2} ; \quad H_3 = \frac{V_3}{Si_3} .$$

As $V_2 = V_3$, and as $Si_3$ is smaller that $Si_2$, it is evident that $H_3$ is bigger than $H_2$ and that, consequently, the advancing section of the liquid in the third tube is in any case greater than the linear advancing section of the second tube, obtained by the suction.

Acting so, the proposed purposes would be reached, at least in part; but some relevant inconveniences would be met; first of all the impossibility of taking safely hold of the end of the third tube, which in any case should be immersed in the container from which the liquid must be transferred, and consequently the enormous and uncomfortable disadvantage to take out the second tube, keyed under pression onto the third tube. Furthermore, even if the second tube could be taken out of the third tube, there would remain the great difficulty of bringing back said tube to the initial position thereof. Finally, the efficiency of such a transfer operation would in any case be not satisfactory, relating to the solution of the problems explained hereinbefore.

In fact, as soon as the liquid from the third tube passes over to the second, even if the advantage of the major flow of the liquid in the third tube in respect to the linear movement of the liquid in the second tube remains unvaried, such advantage will stop for what concerns the transfer from the third to the second tube, and therefore the efficiency would no more correspond to the one which the present invention wants to obtain.

As to eliminate said inconveniences, and obtain an optimal and progressive efficiency also in the passage from the third tube to the second tube, the present invention provides the application with a first tube of major diameter than the one of above said tubes, and said tube will be keyed onto the second tube and, on one end inserted under pression to the inner end of the plastic bush, realized out of one piece with the third tube, and said first tube carries at the opposite end thereof a ring which has the function of establishing a perfect sealing against air and liquid, between the first and the second of said tubes.

According to the present invention, the purpose of the application of the first tube, beyond the one of eliminating above said inconveniences, consists in the fact of allowing a major and progressive efficiency, making use of the area of the crown comprised between the outer and the inner diameter of the second tube.

In fact, by doing so, and the second tube still acting as the sucking element, it will be made use of the crown comprised between the inner section of the second tube ($Si_2$) and the outer section ($Se_2$) of the same second tube, multiplied by $H_2$. This volume will be added to suction volume $V_2$:

Be it:

$V_T$ = the total suction depression $V_2$ = the depression volume sucked by the second tube operating in the third tube;

$Sc_2$ = the crown area comprised between the outer diameter and the inner diameter of the second tube.

The following relatins will follow:

$$V_T = (H_2 \cdot Si_2) + (H_2 \cdot Sc_2) = H_2(Si_2 + Sc_2).$$

$V_T$ therefore shows the maximum progressive efficiency of sucked liquid which can be obtained with the device according to the present invention.

The present invention will be now described according to the enclosed drawings, in which:

FIGS. 1 and 1a show longitudinal sections of the three tubes, connected like a telescope, in the resting position thereof, whereby a section of the three tubes, according to line A-B, the position of the sealing ring and of the coupling bush are shown;

FIGS. 2, and 2a-2c are longitudinal sections according to FIG. 1, in operating position;

FIGS. 3, and 3A show schematic longitudinal sections of the three tubes, connected like a telescope according to the invention, the suction parts being cross hatched;

FIG. 4, shows a schematic and perspective view of the tubes according to the present invention in the transfer position thereof.

In the drawings 3, 2 and 1 show the three tubes which are telescopically connected, which can be better seen in the transversal section thereof according to line A-B (FIG. 1). 4 shows a rubber ring applied over a ring 7 out of plastic material, fixed onto tube 1. Ring 7 prevents a deformation of tube 1 under the pression of rubber ring 4, while rubber ring 4 makes it possible to obtain a perfect sealing between tube 1 and tube 2, and at the same time tube 2 may enter tube 1. 5 shows the bush out of platic material (FIG. 2), showing at one of the ends thereof two coupling shapes, serving for a close connection with tube 3 and tube 1. 6 shows a slide bibcock (Italian patent application No. 51 739 A/78 of Nov. 2, 1978, of the same applicant), said bibcock being opened only for the real transfer operation.

In FIG. 3, the depression sections are cross hatched. The arrows show the direction, where the suction by the tube takes place. The same direction is indicated in FIG. 2 by C.

FIG. 4 shows the operative position of the flexible tube device according to the present invention, all the three tubes being bent.

The functioning of the device according to the present invention is as follows:

The most important thing to be noted is that the level of liquid that must be transferred must be higher than the outlet of the relative tube. Now, slide bibcock 6 must be closed. The device will be immersed, with the end provided with bush 5, in the container, out of which the liquid is to be taken. Then the device will be inclined in the direction of the container into which the liquid is to be transferred. Tube 2 will be taken out of rubber ring 4 while taking care so that the inner end thereof is removed from rubber ring 4. Now a few seconds pass, until the liquid leaving the tube will enter tube 2, and the air that was contained between the walls of the three telescopically connected tubes will fill up the inner wall of tube 1 and the outer wall of tube 3. This air will again move upwardly under the pression of the liquid, whereby said liquid will fill up the place before occupied by the air. Now the slide bibcock will be opened, and the transfer can take place without any difficulty.

What I claim is:

1. A device for the transfer of liquids without a pump by simple hand movement comprising:

first, second and third flexible tubes having first, second and third diameters respectively, said first diameter being greater than said second diameter and said second diameter being greater than said third diameter, said first, second and third tubes being substantially coaxial with one another, a coupling bush connecting a first end of said first tube and a first end of said third tube to position said third tube substantially coaxially within said first tube, said first and third tube defining an annular chamber therebetween, said second tube being positioned between said first tube and said third tube for axial movement between a telescoped position and an extended position, a sealing member at the second end of said first tube to provide a sealing engagement between said second end of said first tube and said second tube in all axial positions of said second tube, said second tube when in the telescoped position having a first end adjacent said coupling bush and a second end extending past said sealing member, and a removable air tight closure at the second end of said second tube, the end of said device adjacent said coupling bush being open solely to the interior of said third tube, the end of said device adjacent to said sealing member being closed by the joint action of said sealing member and said closure, whereby manual extension of said second tube after placing the first end of the device in a liquid medium will draw liquid into the third tube and permit siphoning of the fluid to occur upon flexing the device and upon manual removal of the closure after full extension of the second tube.

2. A flexible tube device according to claim 1, wherein said first tube and said third tube are closely interconnected by means of said coupling bush.

3. A flexible tube device according to claim 1 or 2, wherein a ring is formed from elastic material closely applied to said first tube, said ring sealing said first tube to said second tube in sliding engagement, allowing sealing and at the same time a perfect sliding.

4. A flexible tube device according to claim 3, further comprising a stiff ring formed of plastic material closely applied to the outer end of said first tube to restrain deformation of said first tube under the compression of said elastic ring sealing member.

5. A flexible tube device according to claim 1 or 2, wherein said third tube projects beyond said sealing member to allow the entering of said second tube between said first and third tubes, as well as the flowing of the liquid in direction of the outlet of said second tube.

* * * * *